United States Patent [19]
Stewart

[11] Patent Number: 5,536,057
[45] Date of Patent: Jul. 16, 1996

[54] VEHICLE PARTITION

[75] Inventor: John M. Stewart, Chino Hills, Calif.

[73] Assignee: Troy Sheet Metal Works, Inc., Montebello, Calif.

[21] Appl. No.: 343,257

[22] Filed: Nov. 22, 1994

[51] Int. Cl.⁶ ................................................ B60R 27/00
[52] U.S. Cl. ........................................ 296/24.1; 296/37.16
[58] Field of Search .................................. 296/24.1, 37.8, 296/37.16, DIG. 1; 280/749, 748

[56] References Cited

U.S. PATENT DOCUMENTS

| | | | |
|---|---|---|---|
| 2,525,952 | 10/1950 | Saterlie et al. | 296/37.16 X |
| 3,547,217 | 12/1970 | Garza | 296/24.1 X |
| 4,960,293 | 10/1990 | Bottinick et al. | 280/749 |
| 5,246,261 | 9/1993 | McCormack | 296/24.1 |
| 5,382,068 | 1/1995 | Simmons et al. | 160/327 X |

*Primary Examiner*—Joseph D. Pape
*Attorney, Agent, or Firm*—Small, Larkin & Kidde

[57] ABSTRACT

A vehicle partition that forms a barrier between a rear occupant area and a front occupant area and provides storage space for passengers in the front occupant area using free space in the rear occupant area. The partition includes a storage compartment that extends over unused floor space between passengers in the rear seats of the vehicle. The storage compartment prevents access to the storage space from the rear occupant area and includes mounting brackets for securely storing equipment within the storage space.

14 Claims, 2 Drawing Sheets

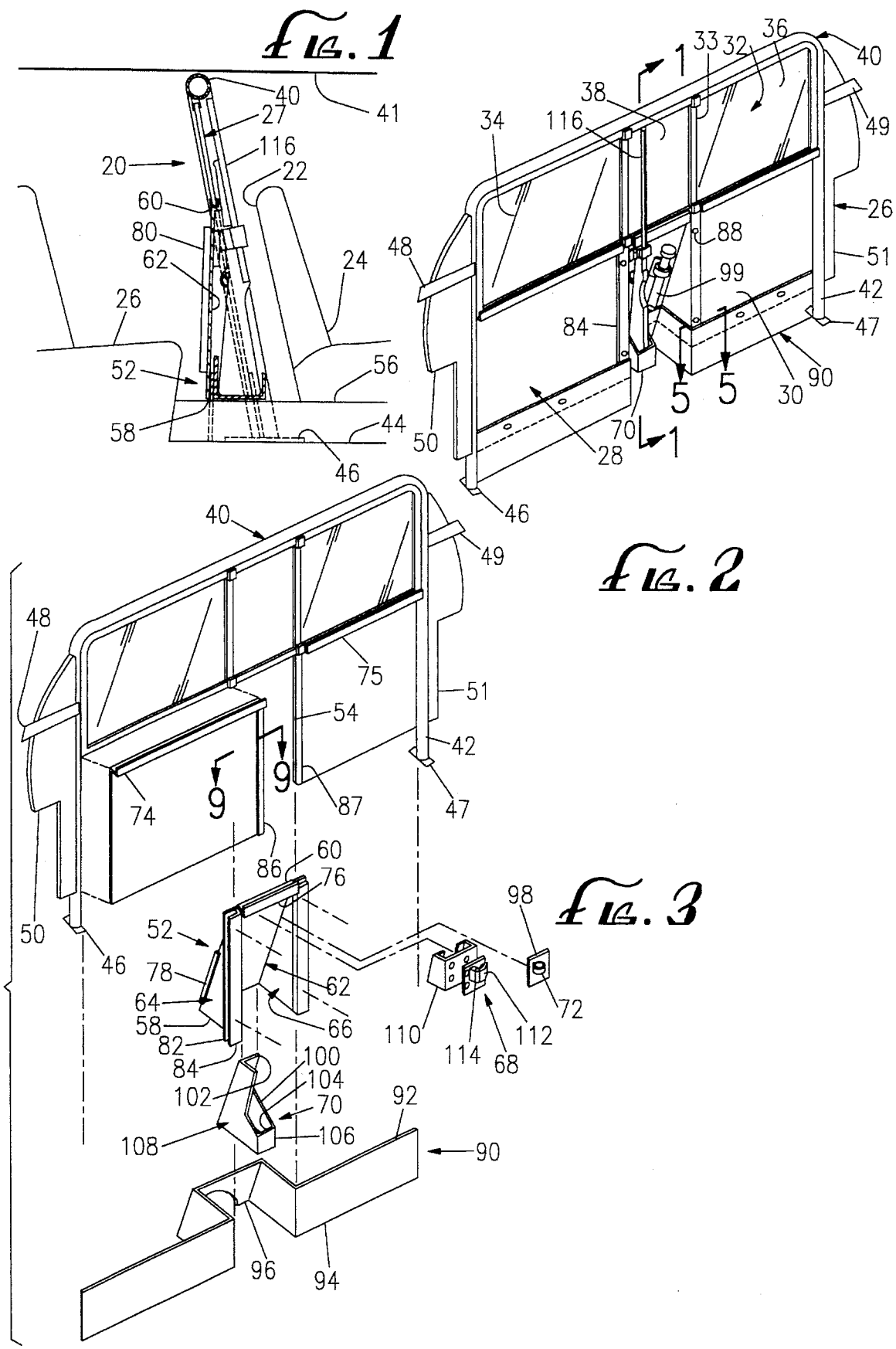

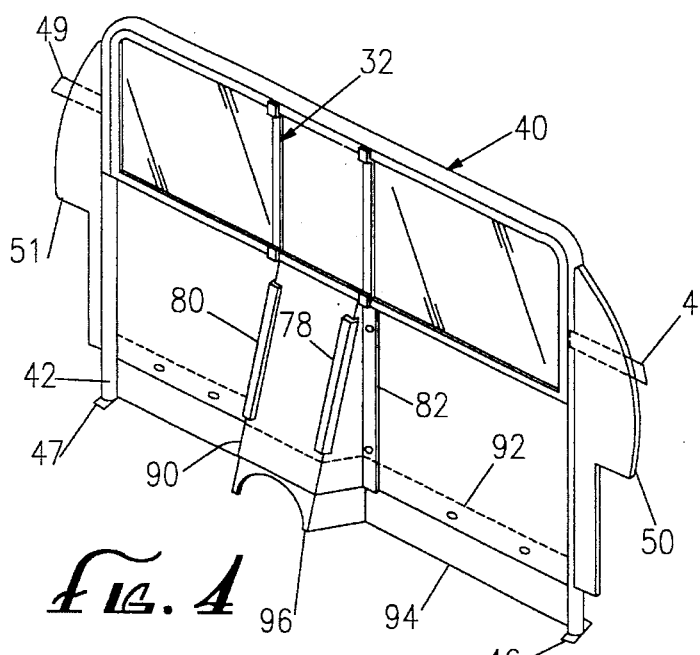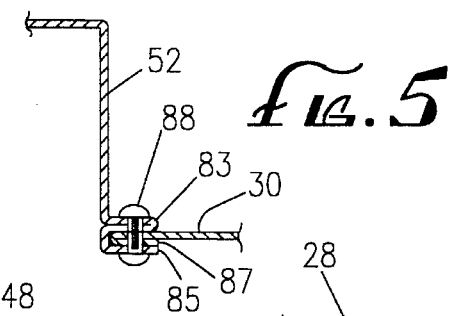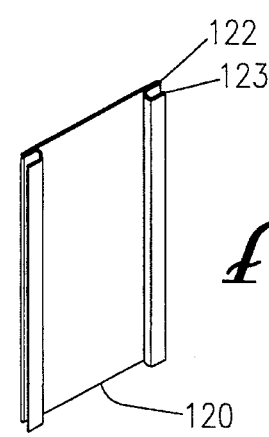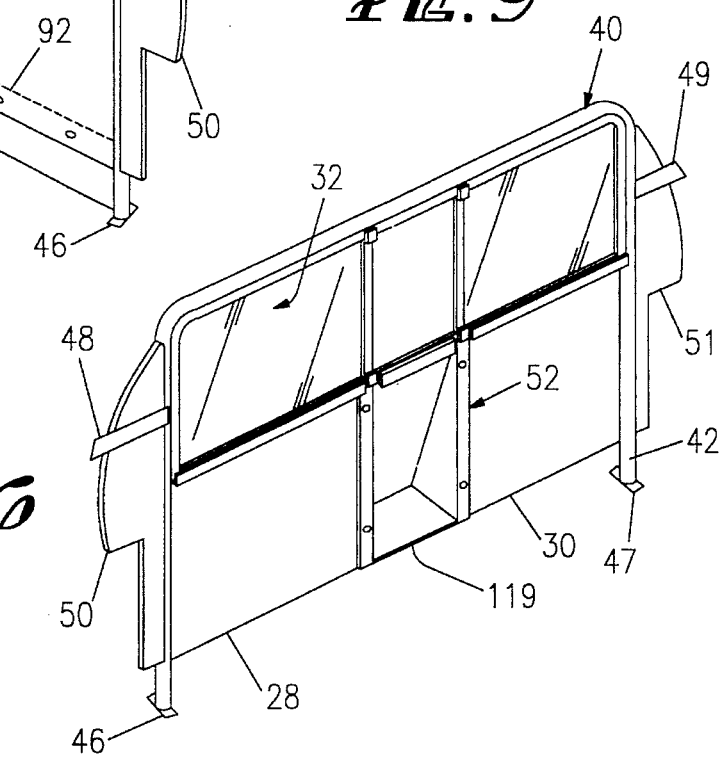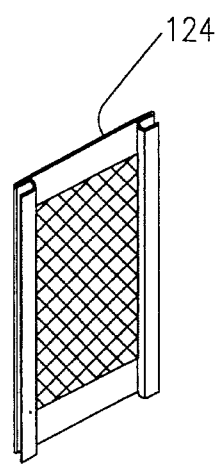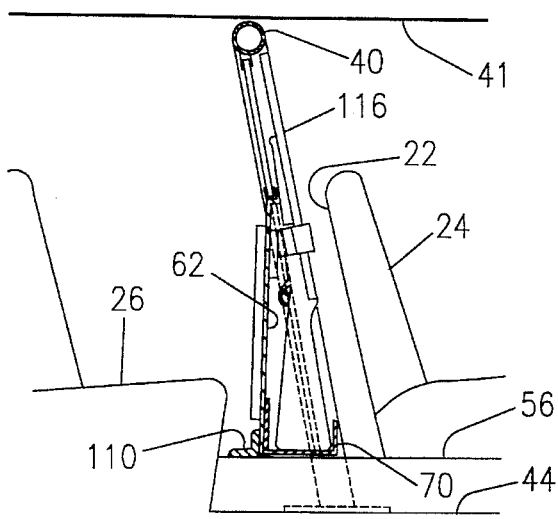

VEHICLE PARTITION

BACKGROUND OF THE INVENTION

The present invention relates to a vehicle partition adapted to separate the space for passengers in the front and rear seats of a vehicle, and relates more particularly to a security partition for police vehicles.

Law enforcement vehicles traditionally have served in a variety of roles, but principally for rapidly transporting law enforcement officers to an emergency scene and transporting alleged law breakers away from crime scenes. A partition is typically included to separate alleged criminals in the back seats of the vehicle from police officers in the front seats. Such partitions generally include a dividing wall located behind the front seats of the vehicle that forms a barrier between the officers and occupants in the rear seats of the vehicle. The dividing wall may be mounted within an inverted U-shaped roll bar that provides added structural support to the vehicle. The dividing wall may include an upper portion configured with a window or screen to provide for visual and/or vocal contact between the front and rear occupants. A lower portion of the partition is preferably constructed of steel or other material to prevent access to the front of the vehicle from the rear. In the past, the forward section of the vehicle provided ample space for storing additional equipment such as riot guns, flashlights, first-aid kits and other equipment the officers may need upon arriving at an emergency scene. Often this equipment has been removably fastened to the front or upper portion of the dash board.

Modern police vehicles not only are equipped for transportation but also include air bags for safety, radar and video equipment for gathering evidence of unlawful activity, and portable computers for accessing a variety of law enforcement databases. With all this additional equipment, the law enforcement officer no longer has the space available to store basic equipment in the front of the vehicle. Thus, the need exists for a way to provide additional space to store and access equipment.

While effectively isolating law enforcement officers from alleged criminals, the vehicle partition also reduces the space available to store equipment within reach of passengers in the front seats of the vehicle. The result is that space in the back passenger area of the vehicle remains unusable by law enforcement officers.

One solution is to install the partition further behind the front passenger seats to increase space between the partition and the front seats; however, this approach reduces leg room space for the passengers in the rear of the vehicle and provides very little additional useable space for the officers. Thus, the need exists for a partition that effectively isolates the front and back seat occupants while increasing the storage space available for occupants in the front seats of the vehicle.

SUMMARY OF THE INVENTION

The objective of the present invention is to provide a vehicle partition that utilizes available space in the rear passenger area of a vehicle to increase the useable storage space for the driver and passenger seated in the front of the vehicle, and that maintains comfortable seating space for passengers seated in the rear of the vehicle. Moreover, the partition of the present invention continues to effectively isolate occupants seated in the rear of the vehicle from occupants seated in the front of the vehicle, and provides easy access from the front passenger area of the vehicle to the storage space located in the rear passenger area while denying access to the storage space from the rear passenger area.

More specifically, the partition includes a conventional dividing wall that forms a barrier between front and rear passenger areas in the vehicle, and a rearwardly offset portion of the partition that occupies space in the rear passenger area that will not interfere with normal occupation by the passengers while providing the additional storage space that is accessible from the front passenger area. For this purpose, the dividing wall is formed with an access opening in the area where the offset portion is to be provided, and an open-sided box-like enclosure is positioned against the rear side of the partition, overlying the access opening, and secured to the partition to prevent access to the interior thereof from the rear. The preferred enclosure is centrally located over the drive shaft hump in the rear passenger space and tapers upwardly from a relatively wide bottom side overlying the floor hump to an upper end that is flush with the partition. The enclosure preferably includes a variety of equipment brackets secured within the enclosure for removably mounting various accessories, for example, a riot gun, a rifle, a first-aid kit, a flashlight or even a cellular phone.

Other features and advantages of the present invention will become apparent from the following detailed description, taken in conjunction with the accompanying drawings, which illustrate, by way of example, the principals of the invention.

DESCRIPTION OF THE INVENTION

FIG. 1 is a cross-sectional side view of a partition device embodying the invention taken along line 1—1 of FIG. 2 and showing the partition disposed between the front and rear passenger seats of a vehicle with a rifle mounted in the storage space;

FIG. 2 is a perspective front view of a partition device embodying the invention and showing a rifle and flashlight mounted in a storage space;

FIG. 3 is an exploded perspective front view of a partition device embodying the present invention and showing a storage compartment to be inserted into a channel, equipment brackets, and a skirt for the partition device;

FIG. 6 is a perspective front view of a partition device embodying the invention showing the storage compartment having a floor mounted to the channel in the partition device;

FIG. 4 is a perspective back view of a partition device embodying the invention and showing a skirt and cushions attached to the partition device;

FIG. 5 is a fragmentary cross-sectional view of the present invention taken along line 5—5 of FIG. 2 and showing the covet bolted to the partition;

FIG. 7 is a front perspective view of a solid center plate for insertion in an access opening in the dividing wall;

FIG. 8 is a front perspective view of a center plate having a screen for insertion in the access opening in the dividing walls;

FIG. 9 is a fragmentary cross-sectional view of the present invent taken along line 9—9 of FIG. 3; and FIG. 10 is a cross-sectional view of the present invention showing a partition installed between the front and rear passenger space of a vehicle with storage compartment mount to the drive shaft hump and housing a rifle therein.

DETAILED DESCRIPTION

As shown in the drawings for purposes of illustration, the invention is embodied in a vehicle security partition, indicated generally by the reference number 20 in FIGS. 1 through 6, for use in a passenger vehicle such as a police patrol car, parts of which are shown in FIG. 1, to form a security barrier between the front and rear passenger spaces, generally behind the backs 22 of the front seats 24 of the vehicle. Such partitions enable the occupant or occupants of the front seats 24 to operate the vehicle and generally perform their duties without concern about interference from the occupant or occupants of the rear seat 26.

The illustrative security partition 20 generally comprises a dividing wall 27 having a lower section that is made up of two plates 28 and 30 that are disposed behind the front passenger seats 24, and an upper section in the form of a framed security window assembly 32. The window may be constructed from lexan, unbreakable glass, a heavy gauge metal screen or a combination of these materials. The illustrative window configuration includes a frame 33 surrounding two clear lexan windows 34 and 36 located on opposite sides of a ventilated center window 38 constructed of vented lexan or a metal screen. This window configuration optimizes the protection behind the front seats 24 and provides a central vent for conversing between the front and back seats.

As is usually the case, the vehicle is provided with an inverted U-shaped roll bar 40 that is disposed generally adjacent to the roof 41 of the vehicle and has laterally spaced legs 42 that extend along the sides of the vehicle between the roof 41 and the floor 44 thereof. The dividing wall is advantageously mounted within the roll bar, generally in the same plane, which herein is inclined upwardly and rearwardly to follow the usual incline of the backs 22 of the front seats. This optimizes the space utilization in the vehicle, including leg room in the rear passenger space and head and shoulder room in the front passenger space. The inclined roll bar is secured to the floor 44 by conventional floor brackets 46 and 47 welded or bolted between the bottom of the roll bar legs and the floor. The roll bar is typically disposed within the vehicle in spaced apart relationship with the sides of the vehicle. Side post brackets 48 and 49, laterally disposed near the vehicle roof, are conventionally welded or bolted between the roll bar legs 42 and the sides of the vehicle (not shown). The security partition may be advantageously supplemented by side panels 50 and 51 contoured to securely fill the gap along the sides of the vehicle and the roll bar.

In accordance with the primary aspect of the present invention, additional storage space is obtained by including a storage compartment 52 (FIGS. 1–3) that is accessible through a central opening 54 located in the lower section of the dividing wall. The opening is preferably between the dividing wall plates 28 and 30 which are disposed in spaced apart relationship within the roll bar 40. The storage compartment 52 is defined by a box-like enclosure that overlies the opening between the plates. The preferred enclosure (FIG. 1) is centrally located over the drive shaft hump 56 in the rear passenger space and tapers upwardly from a relatively wide bottom side 58 overlying the floor hump to an upper edge 60 that is flush with the partition. The enclosure includes a generally rectangular rear wall 62, connected at an upper edge 60 to the dividing wall window assembly 32, that extends downward into the rear passenger space of the vehicle diverging away from the dividing wall plates. The rear wall width advantageously corresponds generally to the width of the dividing wall opening 54 and the diameter of the drive shaft hump 56. Generally triangular opposing side walls 64 and 66 are secured to the rear wall and to the plates thereby enclosing the storage compartment to prevent access from the rear of the vehicle. By way of example, equipment brackets, such as a locking barred bracket 68, base tray 70, and a flashlight bracket 72, are bolted within the enclosure to provide a secure and readily accessible location for various equipment.

In accordance with the detailed aspects of the present invention and with reference to FIG. 3, the dividing wall upper and lower sections may be secured within the roll bar by conventional welding or bolting techniques. The lower section plates 28 and 30 each include an upper edge molded with an L-shaped lip 74 that overlies the bottom and front passenger sides of the window assembly frame thereby permitting welding or bolting of the respective plate lips to the window assembly.

In the preferred embodiment (FIGS. 1–3), the rear wail and opposing side walls are formed from a single metal sheet that is folded along two opposing edges to thereby define the rectangular rear wail 62 between the generally triangular opposing side walls 64 and 66. The enclosure includes an upper edge 60 molded with an L-shaped lip 76 configured to overlie the bottom and front passenger sides of the window assembly frame 33 thereby permitting bolting or welding of the enclosure to the window assembly 30. A pair of cushions 78 and 80, preferably constructed of rubber or plastic, are glued, bolted, or riveted along the opposing rear passenger edges along the rear wail 62 of the enclosure to cushion any contact by the occupants seated in the rear of the vehicle with the opposing edges.

With reference to the left front side of the enclosure, illustrated in FIG. 3, each of the side walls preferably includes a pair of parallel lips 82 and 84, along the respective free edge, laterally extending away from the enclosure to define respective opposing channels therebetween. In a complimentary configuration, the confronting inside edge of each plate (FIGS. 3 and 9) is folded over upon itself to form a re-enforced hem line 86 and 87 thereon that may be inserted into the respective opposing channels between the parallel lips 82 and 84. Referring to FIG. 5 and the right front side of the enclosure, rivets 88, projecting through the parallel lips 83 and 85 and hem line 87, secure the storage compartment 52 to the inside edges of the respective plates.

In the preferred embodiment, the storage compartment 52 and the dividing wall plates 28 and 30 are disposed in spaced apart relation to the drive shaft hump 56 and floor 44 of the vehicle to accommodate a variety of drive shaft hump heights. The preferred embodiment includes a skirt 90 bolted to the dividing wall that extends from an upper edge 92 in overlapping relationship with the front passenger side of each wall of the storage compartment and the dividing plates to a lower edge 94 engaging the floor of the vehicle. The skirt 90 is preferably formed from a uniform metal sheet that is folded into segments that extend downward along the same plane as each of the compartment walls and the dividing wall plates. A rear segment 96, corresponding to the rear wall of the storage compartment, includes an inverted U-shaped notch configured to follow the cylindrical perimeter of the drive shaft hump thereby allowing the skirt 90 to enclose that portion of the hump underlying the storage compartment 52. The uniform construction of the skirt in combination with the enclosure of the hump cooperates to anchor the bottom side 58 of the storage compartment over the hump.

By way of exemplary illustration, a flashlight bracket 72 and a gun rack comprising a locking barrel bracket 68 and a base tray 70 are bolted to the rear wall of the storage compartment. The flashlight bracket 72 may be a conventional C-shaped collar with laterally extended base 98 that bolts to the rear wall to vertically hold a flashlight 99, having a cylindrical housing and an upper widening conical lamp section, therein. The gun rack base tray 70 is a generally rectangular container, bolted to the rear wall of the enclosure, having an inclined opening 100 on the upper side that slopes downward towards the front passenger area. The container inclined opening is defined by a large rectangular back wall 102, a rectangular lip forming the front wall 104, and a pair of side walls 106 and 108, having extending between the front and back walls. The base tray preferably rests upon the drive shaft hump 56 in order to transfer the weight of the gun held within the tray to the hump rather than the storage compartment 52. The locking barrel bracket 68 includes a conventional locking gun rack collar 112 and a mount 110 which is bolted to the rear wall of the enclosure in vertical alignment with the base tray to maintain the collar in spaced apart relation with the rear wall. The collar is bolted to the mount 110 and includes a generally C-shaped arm 112 attached at mid-point to a locking hinge 114. A locking barrel bracket fit for this purpose is Model No. SC-1, manufactured by Santa Cruz, 2301 Tucker Road, Hood River, Oreg. 97031. The locking barrel bracket 68 and tray 70 cooperate to form a gun rack that safely secures a rifle 116 in a generally vertical direction away from the any of the passengers in the vehicle.

In operation, the dividing wall with the storage compartment overlying the dividing wall opening is installed behind the backside of the front seats 24 in a rearwardly inclined direction thereby maximizing the useable space on both sides of the partition. When installed with an inclined dividing wall, the storage compartment 52 (FIGS. 1 and 10) appears as a generally vertical pillar when viewed from the rear of the vehicle. The skirt 90 may then be added to extend the dividing wall to the floor 44 of the vehicle and to re-enforce the storage compartment. Once the skirt 90 has been added the equipment brackets, such as the gun rack 68 and 70 and flashlight bracket 72, are bolted to the rear wall of the vehicle. The gun rack retains the gun 116 in a generally vertical position resting primarily upon the upper surface of the drive shaft hump 56 with the barrel pointing away from any passengers. It will be appreciated that the present invention as described provides access to storage space in the rear of the vehicle while maintaining a barrier between occupants seated in the front and rear passenger spaces and denying access to the storage space by occupants seated in the rear of the vehicle.

In the event that the skirt is not used with the partition, an L-shaped bracket 110 (FIG. 10) is preferably mounted between the rear wall 62 and the hump 56 to re-enforce the storage compartment 52. It will be appreciated that the walls of the gun base tray 70 prevent access to a gun stored therein by occupants in the rear seats reaching under the storage compartment walls when the skirt is not used.

In an alternative embodiment (FIG. 6), the storage compartment may include a support wall forming a floor 119 for the storage space overlying the hump. In yet another embodiment, the rear wall and side support walls may be shaped cylindrically (not shown) to form a cylindrical pillar overlying the center rear passenger floor space. It will additionally be appreciated that the opening in the dividing wall may be positioned in the upper portion as well.

In the event that the storage space is no longer needed or the partition is re-used in a vehicle that cannot accommodate the storage space. The storage compartment may be removed by sliding the storage compartment out 52 of engagement with the plate hem lines. Generally, a center plate 120 (FIG. 7), configured with a pair of laterally extended parallel lips 122 and 123 along the sides forming opposing channels to engage the respective plate hem lines, may then be inserted as an enclosure in overlying relationship with the access opening to thereby cover the opening. The center plate 120 (FIG. 7) may be formed from a uniform metal sheet or the center plate 124 (FIG. 8) may include a metal screen for ventilation between the partition. The center plate thereby permits the dividing wall having an access opening to be used without a storage compartment.

While several particular forms of the invention have been illustrated and described, it will also be apparent that various modifications can be made without departing from the spirit and scope of the invention. Accordingly, it is not intended that the invention be limited, except as by the appended claims.

What is claimed is:

1. A security partition for use in combination with a passenger vehicle having front and rear passenger spaces with front and rear seats therein, a floor, a roof, and an inverted U-shaped roll bar mounted between said front and rear spaces and having legs secured to said floor, said partition comprising:

a dividing wall disposed behind the front seats and inclined upwardly and to the rear to form a security barrier between said spaces, said wall comprising a lower portion formed by at least two plates that are spaced apart to leave a central access opening between them, and an upper portion formed by a window assembly substantially filling the space between said plates and said roll bar; means for securing said dividing wall to said roll bar in the upwardly and rearwardly inclined position;

and a storage compartment disposed behind said dividing wall and overlying said access opening, said storage compartment comprising a generally rectangular rear wall having an upper edge joined to said dividing wall adjacent said window assembly and a lower edge shaped rearwardly from said dividing wall to be substantially vertical when said dividing wall is in its rearwardly inclined position, and opposite generally triangular side walls that are secured to said rear wall and to said plates to enclose said storage compartment and prevent access thereto from said rear passenger space.

2. A security partition as defined in claim 1 wherein said rear wall and said triangular side walls are formed from a uniform metal sheet.

3. A security partition as defined in claim 1 wherein said partition further includes cushions disposed along outside edges formed by said rear wall joined to respective triangular side walls.

4. A security partition as defined in claim 1 wherein said side walls include a pair of parallel lips laterally extending away from said storage compartment defining opposing channels therein and said plates include a re-enforced hem line along confronting sides of said plates whereby said hem lines are slidingly engaged within said opposing channels.

5. A security partition as defined in claim 4 wherein said partition includes bolts to secure each of said hem lines within said respective lips.

6. A security partition as defined in claim 1 wherein said partition includes equipment brackets disposed on the rear wall such that said brackets securely hold equipment within easy reach of occupants seated in the front of the vehicle.

7. A security partition as defined in claim 6 wherein at least one of said equipment brackets is a gun rack.

8. A security partition as defined in claim 7 wherein said gun rack includes a barrel locking bracket and a base tray having an inclined opening securely fastened to said storage compartment in vertically alignment whereby a gun is secured in said gun rack in a generally vertical direction.

9. A security partition as defined in claim 1 wherein said partition includes means for anchoring the bottom of said storage compartment.

10. A security partition as defined in claim 9 wherein said anchoring means is a skirt formed from a uniform metal sheet and folded in segments to extend from the dividing wall and storage compartment to the floor of the vehicle.

11. A security partition for use in combination with a passenger vehicle having front and rear passenger spaces, said partition comprising:

a dividing wall sized and shaped to be mounted within the vehicle between said front and rear passenger spaces to form a security barrier between those spaces, said wall having front and rear sides facing, respectively, into said front and rear passenger spaces, a storage compartment positioned against said rear side of said dividing wall to be disposed in said rear passenger space when said partition is in the vehicle, said storage compartment extending rearwardly from said wall and having an open front side facing toward the wall;

said wall having an access opening aligned with said open front side whereby articles in the compartment are accessible from the front passenger space;

a means for securing said compartment to said wall and preventing access to the interior of the compartment from said rear passenger space.

12. A security partition as defined in claim 11 wherein said storage compartment and rear access opening are centrally located in said wall to overlie the central portion of the vehicle floor in said rear passenger space.

13. A security partition as defined in claim 12 wherein said storage compartment is box-like in shape and tapers upwardly from a relatively wide, rectangular lower end to an apex which is connected to said wall.

14. A security partition for use in combination with a passenger vehicle having front and rear passenger spaces, said partition comprising:

a dividing wall disposed behind the front seats and inclined upwardly and to the rear to form a security barrier between said spaces, said wall comprising a lower portion formed by at least two plates that are spaced apart to leave a central access opening between them, and an upper portion formed by a window assembly substantially filling the space above said plates;

said plates each include an edge along said access opening folded over said plate to define a re-enforcing hem line; and an enclosure overlying said access opening and including laterally extended parallel lips along the sides thereby defining opposing channels for housing said respective hem lines therein.

* * * * *